(12) United States Patent
Moradi et al.

(10) Patent No.: US 12,165,022 B2
(45) Date of Patent: Dec. 10, 2024

(54) DISTRIBUTED MACHINE LEARNING USING NETWORK MEASUREMENTS

(71) Applicant: Telefonaktiebolaget LM Ericsson (publ), Stockholm (SE)

(72) Inventors: Farnaz Moradi, Stockholm (SE); Saurabh Singh, Vallentuna (SE); Selim Ickin, Stocksund (SE); Wenfeng Hu, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/791,628

(22) PCT Filed: Jan. 10, 2020

(86) PCT No.: PCT/EP2020/050477
§ 371 (c)(1),
(2) Date: Jul. 8, 2022

(87) PCT Pub. No.: WO2021/139892
PCT Pub. Date: Jul. 15, 2021

(65) Prior Publication Data
US 2023/0041074 A1 Feb. 9, 2023

(51) Int. Cl.
*G06N 20/00* (2019.01)
*H04L 43/0852* (2022.01)

(52) U.S. Cl.
CPC ......... *G06N 20/00* (2019.01); *H04L 43/0852* (2013.01)

(58) Field of Classification Search
CPC ............................ G06N 20/00; H04L 43/0852
(Continued)

(56) References Cited

U.S. PATENT DOCUMENTS 11,296,971 B1 *  4/2022  Jain ........................ H04L 43/08
2008/0151771 A1 *  6/2008  Dowse ................ H04L 43/0858
                                                              370/252

(Continued)

FOREIGN PATENT DOCUMENTS

JP         2007074202 A  *  3/2007

OTHER PUBLICATIONS

International Search Report and Written Opinion dated Oct. 13, 2020 in International Application No. PCT/EP2020/050477 (13 pages).

(Continued)

*Primary Examiner* — Zi Ye
(74) *Attorney, Agent, or Firm* — Rothwell, Figg, Ernst & Manbeck, P.C.

(57) ABSTRACT

A method performed by a central server node in a distributed machine learning environment is provided. The method includes: managing distributed machine learning for a plurality of local client nodes, such that a first set of the plurality of local client nodes are assigned to assist training of a first central model and a second set of the plurality of local client nodes are assigned to assist training of a second central model; obtaining information regarding network conditions for the plurality of local client nodes; clustering the plurality of local client nodes into one or more clusters based at least in part on the information regarding network conditions; re-assigning a local client node in the first set to the second set based on the clustering; and sending to the local client node a message including model weights for the second central model.

19 Claims, 7 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 2010/0238828 | A1* | 9/2010 | Russell | ............... H04L 43/0864 |
| | | | | 370/252 |
| 2019/0141604 | A1* | 5/2019 | Sarangi | ................. H04W 40/32 |
| 2019/0220703 | A1* | 7/2019 | Prakash | ................. G06V 10/95 |

OTHER PUBLICATIONS

Demichelis, C. et al., "IP Packet Delay Variation Metric for IP Performance Metrics (IPPM)", Network Working Group, Request for Comments (RFC) 3393, Category: Standards Track, Ericsson IPI, Nov. 2002 (21 pages).

Vandikas, K. et al., "Privacy-aware machine learning: with Low Newtork Footprint", Charting the Future of Innovation, No. 9, Ericsson Technology Review, Oct. 21, 2019 (7 pages).

* cited by examiner

DISTRIBUTED MACHINE LEARNING USING NETWORK MEASUREMENTS

CROSS REFERENCE TO RELATED APPLICATION(S)

This application is a 35 U.S.C. § 371 National Stage of International Patent Application No. PCT/EP2020/050477, filed Jan. 10, 2020.

TECHNICAL FIELD

Disclosed are embodiments related to distributed machine learning using network measurements.

BACKGROUND

In federated learning (a type of distributed machine learning), a central server node maintains a central machine learning (ML) model by aggregating model weights which are trained locally at local client nodes. In this learning technique, the local client nodes share computed weights on their individual datasets with the central server node instead of the actual data itself. Hence, this technique is an alternative solution to address scenarios where local or regional datasets are not allowed (or are not wanted) to leave the region to protect privacy.

The collection of local client nodes training a particular central ML model are referred to as a federation. If a new local client node joins a federation and has a different data distribution than other local client nodes in the federation, or if the data distribution of one of the existing local client nodes changes during training, the performance of the central ML model can be affected. Moreover, if a local client node's network condition changes, the delays in updating the weights can impact the accuracy of the global model, particularly if network related features are used in training the central ML model.

Federated learning proceeds in rounds. Over a number of rounds, the central ML model is iteratively improved. For each round, the central server node selects one or more local client nodes to participate. Selection of local client nodes has been studied in the prior art. Typically, local client nodes (e.g., mobile phones) which meet the eligibility criteria (e.g., charging and connected to an unmetered network) periodically connect to the central server node. The central server node selects a subset of local client nodes for each round. The local client nodes which are not selected for a particular round are instructed to reconnect at a later point in time.

Another approach for selecting local client nodes for a given round is to select local client nodes based on their resource conditions. For example, the central server node may receive weight updates sequentially due to cellular bandwidth limits. The local client nodes send their resource status to the central server node, which then selects the local client nodes which can finish the round before a deadline.

Some existing solutions assume that the central server node (e.g., a base station) has perfect knowledge of the model size and other measured data such as multiuser channel gains and local computation capacities of the local client nodes (e.g., mobile devices) and uses this knowledge to determine an efficient strategy for scheduling and allocating bandwidth.

SUMMARY

In existing solutions, either monitoring of local client nodes' status is not used at all, or, the local client nodes share their status information with the central server node actively in a separate network payload. In cases where no monitoring data is used, a federation may include local client nodes which have very different data distributions (or even inaccurate/noisy datasets). This can negatively impact the performance and training of the central ML model. In cases where monitoring data is used, the payload actively shared by local client nodes might contain information about the remaining battery of a device, the quality of a network link, mobility, and so on. This information is obtained by active measurement using device sensors and reporting the measured observations back to the central server node, for the central server node to decide (or not) to involve local client nodes in a given round of federated learning. When local client nodes share their resource conditions in this manner, privacy can be a concern.

Accordingly, there is a need for improved systems and methods for managing distributed machine learning, including federated learning.

Embodiments improve the performance of models trained in a distributed manner by dynamically clustering local client nodes which have similar network conditions such that similarly clustered local client nodes belong to a common federation. Embodiments also measure network conditions passively by leveraging the existing network link between the local client nodes and the central server node.

Embodiments can result in various advantages. For example, by passive monitoring the local client nodes' network condition and then re-grouping the local client nodes with similar data distributions, the performance of the central ML model may be improved. Continuous monitoring may also make it possible to dynamically update the grouping of local client nodes that participate in the distributed machine learning. Additionally, passive monitoring is low overhead and will not impact the communication cost for distributed machine learning. Also, the joining and leaving of local client nodes to a particular federation during training will not negatively impact the performance of the central ML model for the rest of the local client nodes.

According to a first aspect, a method performed by a central server node in a distributed machine learning environment is provided. The method includes managing distributed machine learning for a plurality of local client nodes, such that a first set of the plurality of local client nodes are assigned to assist training of a first central model and a second set of the plurality of local client nodes are assigned to assist training of a second central model; obtaining information regarding network conditions for the plurality of local client nodes; clustering the plurality of local client nodes into one or more clusters based at least in part on the information regarding network conditions; re-assigning a local client node in the first set to the second set based on the clustering; and sending to the local client node a message including model weights for the second central model.

In some embodiments, the method further includes identifying a change in a network condition of at least one of the local client nodes based on the obtained information regarding network conditions for the plurality of nodes, and wherein clustering the plurality of local client nodes is performed in response to identifying a change in a network condition. In some embodiments, obtaining information regarding network conditions for the plurality of local client nodes comprises performing passive monitoring of the network conditions. In some embodiments, performing passive monitoring of the network conditions comprises computing one-way and/or round-trip delay times based on messaging between the central server node and the plurality of local client nodes relating to model weight computations. In some embodiments, the processor is further configured to estimate network conditions based on the obtained information regarding network conditions. In some embodiments, estimating network conditions comprises estimating statistics for the network conditions over a time window, wherein the statistics include one or more of a mean, a median, a percentile, a standard deviation, a minimum, and a maximum, and wherein the network conditions include one or more of delay, delay jitter, and packet loss.

According to a second aspect, a method performed by a central server node in a distributed machine learning environment is provided. The method includes: sending a first message to a local client node assigned to assist training of a central model, the first message indicating to the local client node that the local client node is to participate in a first round of distributed machine learning and to compute updated model weights for the central model; receiving a second message from the local client node comprising the updated model weights for the central model; computing a delay measurement based on one or more of the first message and the second message; identifying a change in a network condition of the local client node based at least in part on the delay measurement; and managing distributed machine learning based at least in part on the identified change in a network condition of the local client node.

In some embodiments, the first message further includes initial model weights, and the initial model weights may be the same initial model weights that the central server node sends to other local client nodes participating in the first round of distributed machine learning. In some embodiments, managing distributed machine learning based at least in part on the identified change in a network condition of the local client node comprises: determining to include the local client node in a second round of distributed machine learning based at least in part on the identified change in a network condition of the local client node; and in response to the determining, sending a third message to the local client node, the third message indicating to the local client node that the local client node is to participate in the second round of distributed machine learning and to compute updated model weights for the central model. In some embodiments, managing distributed machine learning based at least in part on the identified change in a network condition of the local client node comprises determining not to include the local client node in a second round of distributed machine learning based at least in part on the identified change in a network condition of the local client node. In some embodiments, managing distributed machine learning based at least in part on the identified change in a network condition of the local client node comprises: in response to the identified change in a network condition of the local client node, clustering the local client node and one or more additional local client nodes based at least in part on the delay measurement; and determining, based at least in part on the clustering, to re-assign the local client node to another central model different from the central model.

In some embodiments, the third message further includes model weights (e.g., as aggregated from updated model weights from the local client nodes by the central server node, such as by averaging). In some embodiments, computing a delay measurement based on one or more of the first message and the second message comprises computing a round-trip delay based on both the first message and the second message. In some embodiments, computing a delay measurement based on one or more of the first message and the second message comprises computing a one-way delay based on the second message. In some embodiments, the method further includes sending additional messages to the local client node indicating to the local client node that the local client node is to participate in additional rounds of distributed machine learning and to compute updated model weights for the central model; receiving additional messages from the local client node comprising the updated model weights for the central model; computing, for each round of the additional rounds of distributed machine learning, a delay measurement based on the additional messages sent to and received from the local client node; and computing one or more of latency, throughput, and jitter based on the delay measurements, wherein identifying a change in a network condition of the local client node based at least in part on the delay measurement is further based at least in part on the one or more of latency, throughput, and jitter.

According to a third aspect, a central server node is provided. The central server node includes a memory; and a processor. The processor is configured to: manage distributed machine learning for a plurality of local client nodes, such that a first set of the plurality of local client nodes are assigned to assist training of a first central model and a second set of the plurality of local client nodes are assigned to assist training of a second central model; obtain information regarding network conditions for the plurality of local client nodes; cluster the plurality of local client nodes into one or more clusters based at least in part on the information regarding network conditions; re-assign a local client node in the first set to the second set based on the clustering; and send to the local client node a message including model weights for the second central model.

According to a fourth aspect, a central server node is provided. The central server node comprises a memory; and a processor. The processor is configured to: send a first message to a local client node assigned to assist training of a central model, the first message indicating to the local client node that the local client node is to participate in a first round of distributed machine learning and to compute updated model weights for the central model; receive a second message from the local client node comprising the updated model weights for the central model; compute a delay measurement based on one or more of the first message and the second message; identify a change in a network condition of the local client node based at least in part on the delay measurement; and manage distributed machine learning based at least in part on the identified change in a network condition of the local client node.

According to a fifth aspect, a computer program is provided comprising instructions which when executed by processing circuitry causes the processing circuitry to perform the method of any one of the embodiments of the first and second aspects.

According to a sixth aspect, a carrier is provided containing the computer program of the fifth aspect, wherein the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
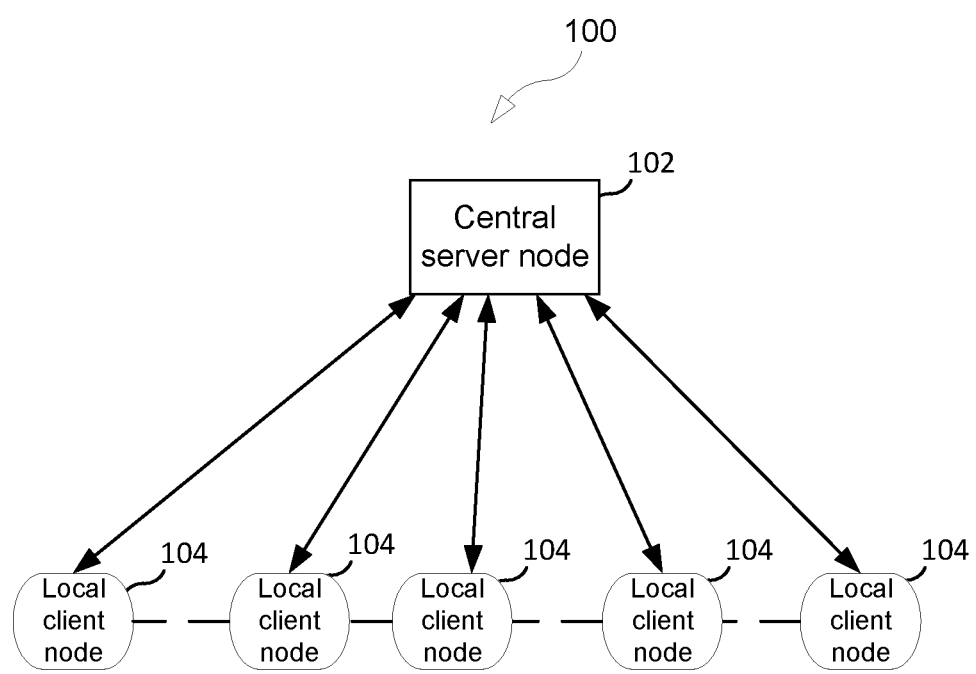
FIG. 1 illustrates a distributed machine learning system according to an embodiment.

FIG. 1 illustrates a system 100 of machine learning according to an embodiment. As shown, a central server node or computing device 102 is in communication with one or more local client nodes or computing devices 104. Optionally, local client nodes or computing devices 104 may be in communication with each other utilizing any of a variety of network topologies and/or network communication systems. For example, local client nodes 104 include user computing devices such as a smart phone, tablet, laptop, personal computer, and so on, and may also be communicatively coupled through a common network such as the Internet (e.g., via WiFi) or a communications network (e.g., LTE or 5G). Central server nodes 104 may include computing devices such as servers, base stations, mainframes, and cloud computing resources. While a central server node or computing device 102 is shown, the functionality of central server node 102 may be distributed across multiple nodes, and may be shared between one or more of local client nodes 104.

As shown, each local client node 104 may communicate model updates to the central server node 102, and central server node 102 may send the updated central model to the local client nodes 104. The link between local client nodes 104 and central server node 102 is shown as being bidirectional between those entities (e.g. with a two-way link, or through a different communication channel).

Distributed machine learning refers to a machine learning technique where distributed local client nodes 104 participate in training a central model stored on a central server node 102. An example of distributed machine learning is federated learning.

Distributed machine learning (e.g., federated learning) as described in embodiments herein may involve one or more rounds, where a central model is iteratively trained in each round. Local client nodes 104 may register with the central server node 102 to indicate their willingness to participate in the distributed machine learning of the central model, and may do so continuously or on a rolling basis. Upon registration (and potentially at any time thereafter), the central server node 102 transmits training parameters to local client nodes 104. The central server node 102 may transmit an initial model to the local client nodes 104. For example, the central server node 102 may transmit to the local client nodes 104 a central model (e.g., newly initialized or partially trained through previous rounds of federated learning). The local client nodes 104 may train their individual models locally with their own data. The results of such local training may then be reported back to central server node 102, which may pool the results and update the central model. This process may be repeated iteratively. Further, at each round of training the central model, central server node 102 may select a subset of all registered local client nodes 104 (e.g., a random subset) to participate in the training round.

Embodiments disclosed herein make use of monitoring network conditions of local client nodes 104, e.g. by making use of (or piggybacking on) pre-existing network communication. By network conditions of a local client node 104, it is meant network conditions between that local client node 104 and the central server node 102. For instance, as described herein, network measurements may include measuring delay based on communication of model weights to and from local client nodes 104, where local client nodes 104 are sending such model weights to central server node 102 and receiving such model weights from central server node 102. This facilitates the passive monitoring of network conditions (e.g., link quality) between the central server node 102 and one or more local client nodes 104. Such passive monitoring can be advantageous over active monitoring in some embodiments. Whether actively or passively monitored, embodiments may make use of such network measurements to identify anomalies or changes in network conditions, and to cluster local client nodes 104 based on those network conditions.

Embodiments are particularly advantageous for a central server node 102 which is located at the edge or gateway and can monitor the network conditions between itself and the local client nodes 104. Furthermore, for use-cases where the central ML model uses network data as features, such use-cases can benefit from embodiments. Examples of such use-cases include key-performance indicator (KPI) degradation analysis (e.g., latency degradation, throughput degradation, and so on).

For instance, if the network link quality (e.g., latency, throughput) between the central server node 102 and only a particular local client node 104 degrades, that degradation might also be used as an indicator for that particular local client node's 104 network link quality itself. This then might help the central server node 102 to decide not to involve that particular local client node 104 to the federation, and then to use the network condition as an input parameter while clustering the local client nodes 104 into groups. This way, the local client nodes 104 that have network issues can be grouped together as they share common network characteristics (e.g., low throughout, high latency), and then a central ML model that is federated mainly in between the members of this group can be obtained to serve particularly those local client nodes 104 that are in poor network conditions, and without negatively affecting the central ML model federated between local client nodes 104 that have good network conditions.

Figure 2:
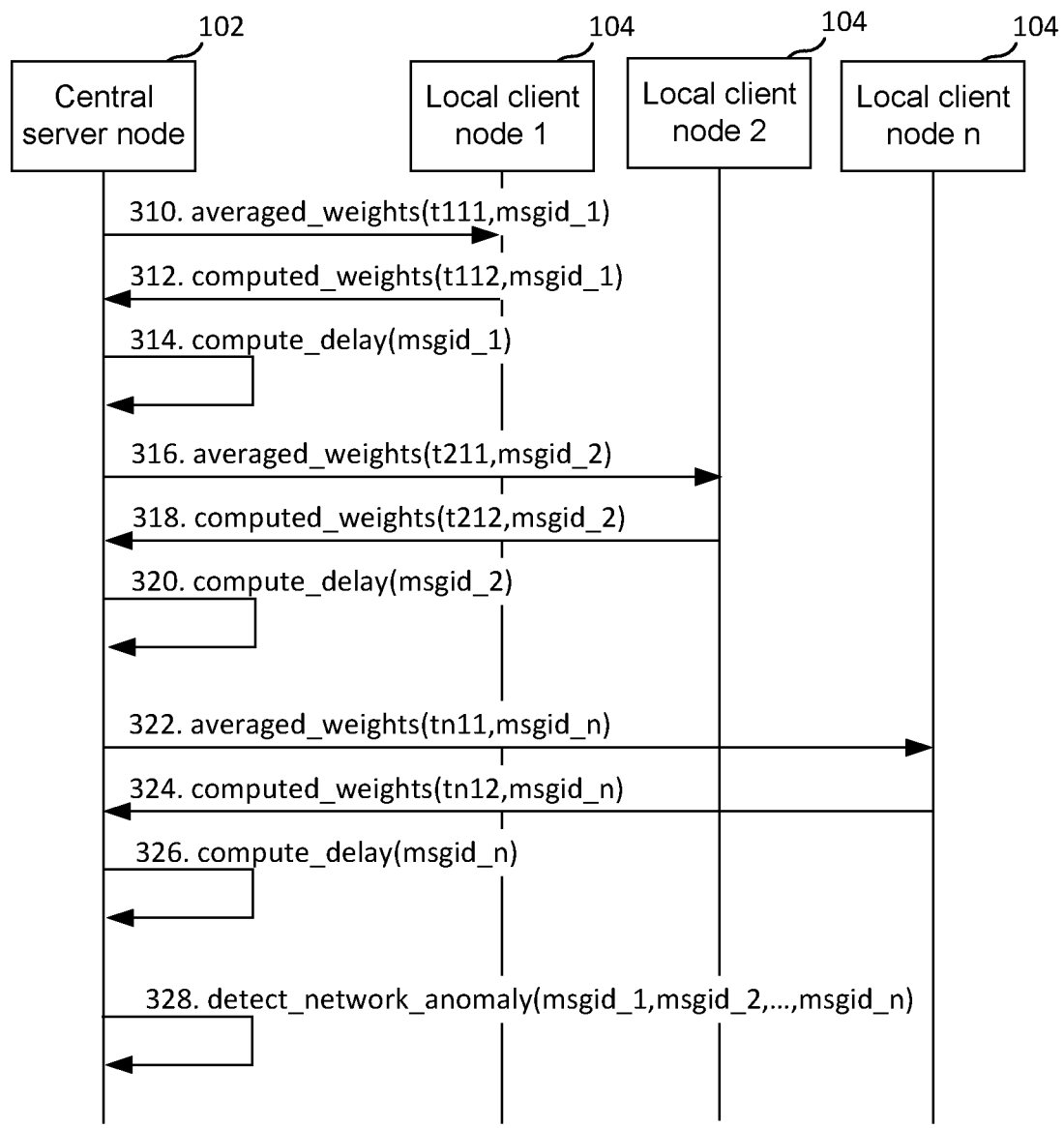
FIG. 2 illustrates a message diagram according to an embodiment.

FIG. 2 illustrates a message diagram according to an embodiment. As shown, the message flow is for one round of distributed machine learning involving central server node 102 and up to n local client nodes 102.

For each local client node 102 participating in the current round, the central server node 102 instructs (at 310, 316, and 322) the local client nodes 104 to compute a local update to the central model. In some embodiments, this instruction may be included in a message sending the current weights for the central model (e.g., which may be the averaged weights from a previous round). As illustrated, in some embodiments central server node 102 may include a timestamp (t111, t211, . . . , tn11) indicating when the message was sent to the local client node 104. In response to this message, each of the local client nodes 104 internally computes a local update to the central model (using data local to the particular local server node 102), and then sends those updates (at 312, 318, and 324) back to the central server node 102. As illustrated, in some embodiments, the central server node 102 may include a timestamp (t112, t212, . . . , tn12) indicating when the update was received by the central server node 102. When the central server node 102 receives the updated weights, the central server node may compute (at 314, 320, and 326) a network delay. The central server node 102 may also update the central model with the updated weights from each of the local client nodes 104. While the figure illustrates the timestamps being sent with the messages, in some embodiments the central server node 102 may record timestamps before a message is sent, or when a message is received, without explicitly including a timestamp in any outgoing communication.

Central server node 102 may compute a network delay in a number of ways. As illustrates in FIG. 2, timestamps of the form "t<local client node identifier>, <round identifier>, <message direction>" are used, where "local client node identifier" refers to the particular local client node that a message was sent to or received from (1, 2, . . . n), "round identifier" refers to the current round (e.g., 1), and "message direction" is 1 if the direction is from the central server node 102 to a local client node 104, and 2 if the direction is from a local client node 104 to the central server node 102. With these timestamps, a round-trip delay on worker n for round 1 may be calculated as follows:

$$\text{compute\_delay}(\text{msgid\_}n) = tn12 - tn11$$

The value of msgid_i resets every round, as the round-trip delay is computed each round.

Instead of round-trip delay, in some embodiments the central server node 102 may measure packet delay variation (RFC 3393), i.e. compute a one-way delay. For example, if there is a timestamp generated when the updated weights are sent from the local client node 104 to the central server node 102 (e.g., from an HTTP header) and another timestamp when the updated weights are received at the central server node 102, then the difference between these two timestamps provides the one-way delay. For this computation to be meaningful, the clocks at the central server node 102 and local client nodes 104 should be synchronized (or an offset for the clocks should be known). If the clocks are not synchronized (or an offset is not known), the delay calculation may need to rely on the round-trip delay.

Measuring delay can be inform the central server node 102 about network conditions. For example, variations in the round-trip delay may indicate an anomalous delay jitter, and therefore potential anomalies in the network connectivity. In the case of one-way delay measurement, the delay measurements may reveal the network delay, indicating potential changes in the network characteristics of the node, e.g., if it relocated from a 4G connectivity to 2G. In general, the one-way delay measurement may be a better granularity measurement than the round-trip delay measurement, because it is easier to distinguish network delay from computation (training) time in the worker nodes. In the cases where one-way-delay measurement is not applicable (or not possible due to technical limitations), then the measured round-trip delay can tell at least one of the following: an anomaly in the computation time, the time it takes a model to converge and send back the weights, has increased from expected (nominal) computation time, or (ii) an anomaly in the network communication delay. An anomaly in the computation time might be an indication that the data in the local client node 104 has changed, thus making it harder to train (e.g., in the cases where early-stopping is employed). An anomaly in the network communication delay, might be an indication of changes in the network characteristics of the node, e.g., if it relocated from a 4G connectivity to 2G, and so on.

In addition to delay (as illustrated in FIG. 2), other network conditions may also be calculated. For example, jitter, latency, throughput, and other network conditions may be calculated and used by the central server node 102.

At the end of the round, the central server node 102 may also detect a network anomaly among the local client nodes 104 and their corresponding network conditions. For example, if local client node n has had a round-trip delay of 3 seconds for the last several rounds, and now has a round-trip delay of 1 minute, central server node 102 may flag that as an anomaly. Likewise, if local client node n has had a consistent throughput of 1 Mbit/s and now has a throughput of 0.5 kbit/s, central server node 102 may flag that as an anomaly. Anomaly detection algorithm may use any of the measured network conditions as an input feature set, and based upon learned thresholds, determine whether or not there exists an anomaly at a given local client node or not.

The computation of network features, and the detection of the network anomalies on all nodes, may be performed by the central server node 102 at the end of every round and may be tracked over multiple rounds (e.g., to avoid oscillation in decisions). In some embodiments, the central server node 102 may consider act on an anomaly only where the anomaly on a particular local client node 104 persists over multiple rounds.

In some embodiments, the central server node 102 may make use of such computation of network features to cluster the local client nodes 104 into clusters based on their network features. That is, local client nodes 104 having similar network features (e.g., delay) would belong to the same cluster, while local client nodes 104 having dis-similar network features would belong to different clusters. An example of a clustering algorithm that may be used is k-means clustering, although any other clustering algorithm may also be used. In some embodiments, the central server node 102 will only perform the clustering where a network anomaly is first detected. The clustering may be used by central server node 102 in a number of ways. For example, central server node 102 may decide not to include a local client node 104 in one or more future rounds of training based on the results of the clustering. Alternatively, or in addition, central server node 102 may decide that a local client node 104 should be removed from the federation (i.e. not be responsible for training the central model), and/or decide that the local client node 104 should be added to a different federation (i.e. responsible for training a different central model), based on the results of the clustering. For example, if clustering results in two clusters, where each member of the federation except for one belongs to the first cluster, and the one exception belongs to a second cluster, that one exception may be removed from the federation and/or added to another federation.

Figure 3A:
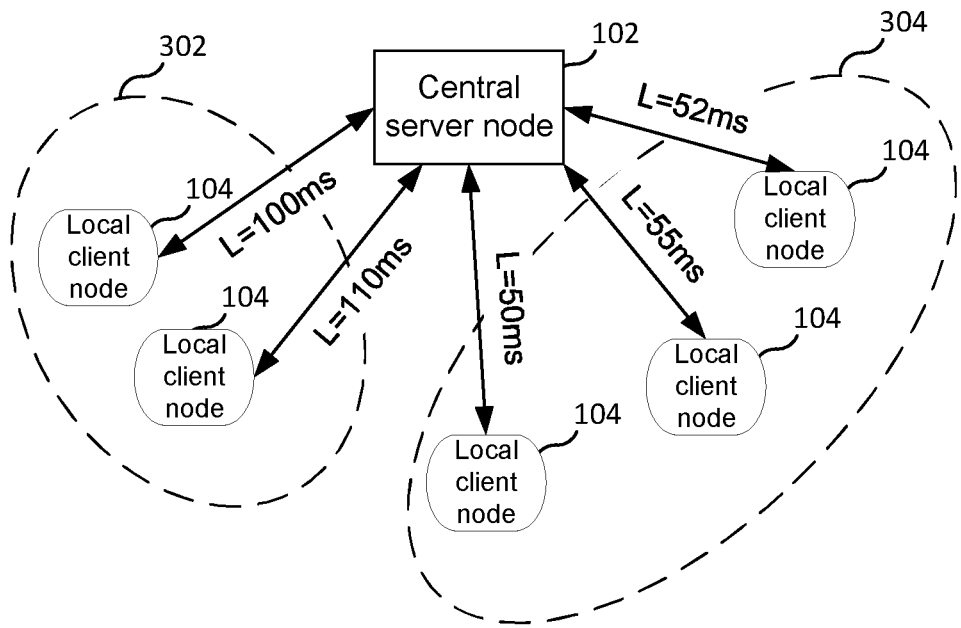
FIGS. 3A-3B illustrate clustering according to an embodiment.
Figure 3B:
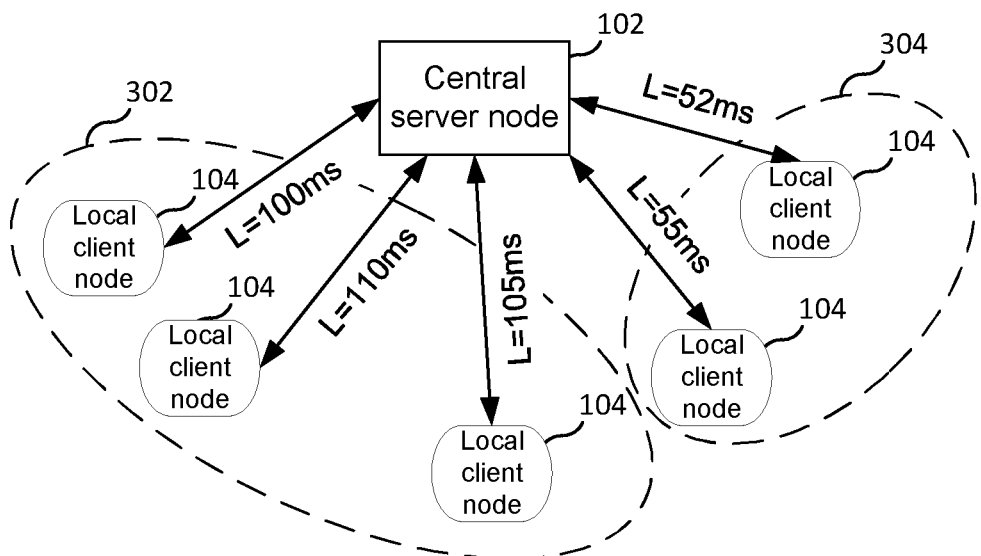

FIGS. 3A-3B illustrates clustering according to an embodiment. As shown in FIG. 3A, two local client nodes 104 belong to cluster 302 and three local client nodes 104 belong to cluster 304. The nodes 104 belonging to cluster 302 have similar latency information (L=100 ms, L=110 ms), and likewise the nodes 104 belonging to cluster 304 have similar latency information (L=50 ms, L=55 ms, L=52 ms). In FIG. 3B, three nodes 104 belong to cluster 302, and two nodes 104 belong to cluster 304, one of the nodes 104 having moved between clusters 302 and 304. In particular, the node in FIG. 3B with latency L=105 ms (previously L=50 ms) is now in cluster 302. The change in that node's 104 latency caused it to belong to a different cluster.

In an embodiment, the two nodes 104 in cluster 302 (in FIG. 3A) may be training a first central ML model on central server node 102, and the three nodes 104 in cluster 304 (in FIG. 3A) may be training a second central ML model on central server node 102. As a result of one of the nodes 104 changing its latency from L=50 ms to L=105 ms, the central server node 102 may detect an anomaly and trigger re-clustering. Based on the result, because the node 104 with L=105 ms has moved from cluster 302 to cluster 304 (in FIG. 3B), the central server node 102 may direct that node 104 no longer be part of the federation training the first central ML model and instead that it be part of the federation training the second central ML model.

In some embodiments, one or more local client nodes 104 may join a new federation or leave an old federation from time to time. This creates a situation where a new local client node 104 is joining a federation that has already begun to train a central ML model. In some circumstances, where the training has progressed to a certain degree, a new and late-joining local client node 104 may degrade the performance of the model if it is allowed to initially train the model. A possible reason for this is that the overall model has already reached saturation and the new model trained by the late joining local client node 104 is only at its initial training phase. In order to guard against these circumstances, in some embodiments, one or more policies may be adopted for these late joining local client nodes 104. For example, one policy is that new local client noes 104 are not allowed to contribute to the overall weights of the aggregated model within a set number of rounds (e.g., n rounds, where n=2, 3, 4, 5, and so on). Another policy is to set a threshold for controlling the training. The aggregation and retraining on all nodes are allowed for instance when the overall accuracy on the local client nodes 104 models decreases below some threshold. This way, the overall model accuracy can be sustained when a local client node 104 joins late in training.

Figure 4:
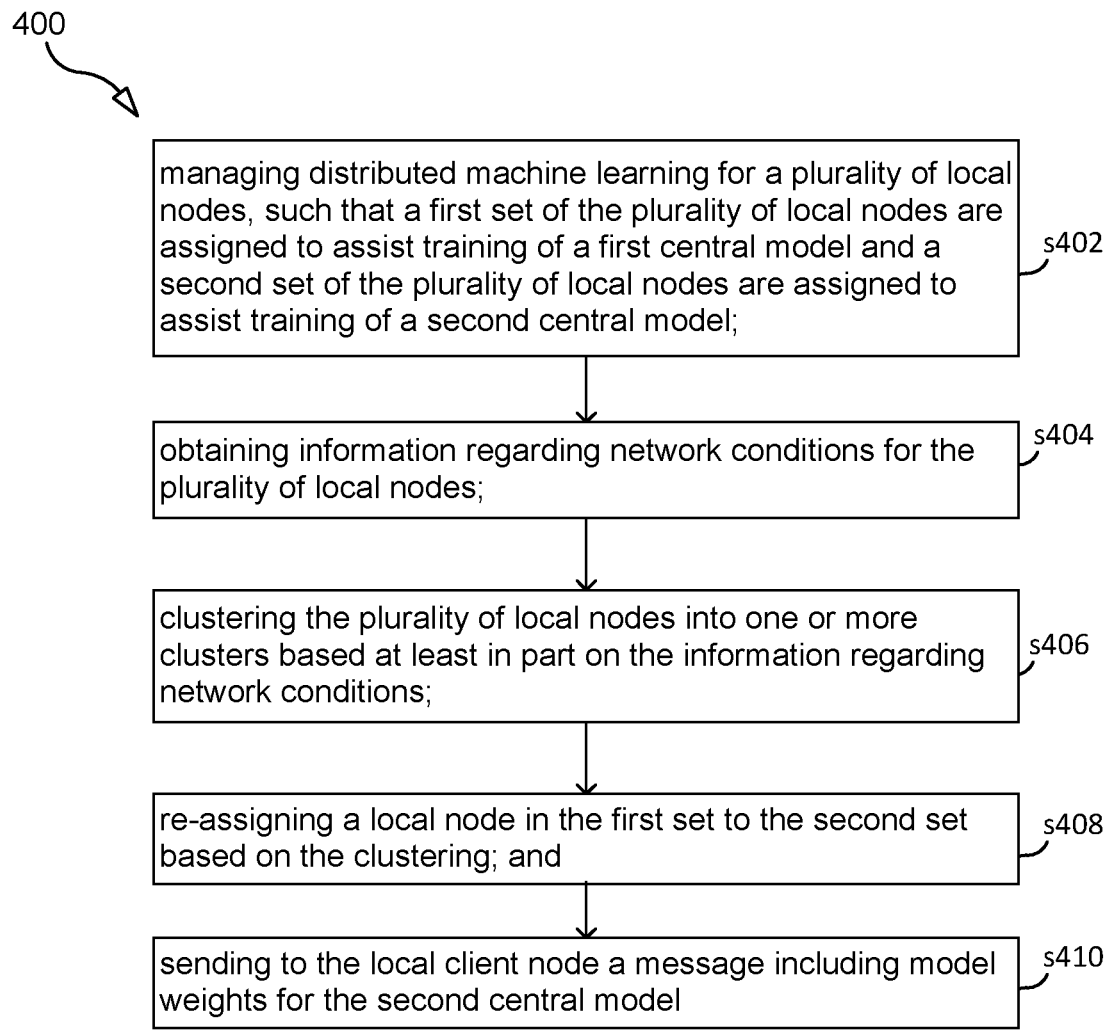
FIG. 4 is a flow chart according to an embodiment.

FIG. 4 illustrates a flow chart according to an embodiment. Process 400 is a method performed by a central server node 102 in a distributed machine learning environment (e.g., a federated learning environment). Process 400 may begin with step s402.

Step s402 comprises managing distributed machine learning for a plurality of local client nodes, such that a first set of the plurality of local client nodes are assigned to assist training of a first central model and a second set of the plurality of local client nodes are assigned to assist training of a second central model.

Step s404 comprises obtaining information regarding network conditions for the plurality of local client nodes.

Step s406 comprises clustering the plurality of local client nodes into one or more clusters based at least in part on the information regarding network conditions.

Step s408 comprises re-assigning a local client node in the first set to the second set based on the clustering.

Step s410 comprises sending to the local client node a message including model weights for the second central model.

In some embodiments, the method further includes identifying a change in a network condition of at least one of the local client nodes based on the obtained information regarding network conditions for the plurality of nodes. Clustering the plurality of local client nodes is performed in response to identifying a change in a network condition. In some embodiments, obtaining information regarding network conditions for the plurality of local client nodes comprises performing passive monitoring of the network conditions. In some embodiments, performing passive monitoring of the network conditions comprises computing one-way and/or round-trip delay times based on messaging between the central server node and the plurality of local client nodes relating to model weight computations.

In some embodiments, the processor is further configured to estimate network conditions based on the obtained information regarding network conditions. In some embodiments, estimating network conditions comprises estimating statistics for the network conditions over a time window, wherein the statistics include one or more of a mean, a median, a percentile, a standard deviation, a minimum, and a maximum, and wherein the network conditions include one or more of delay, delay jitter, and packet loss. For example, multiple aggregations of passive measurements of the network conditions may be used (such as over a given time window), and descriptive statistics (such as mean, median, percentiles, standard deviation, minimum, maximum) of delay, delay jitter (delay variation), packet loss (e.g., if an expected message containing weight information was not received on time), and so on.

Figure 5:
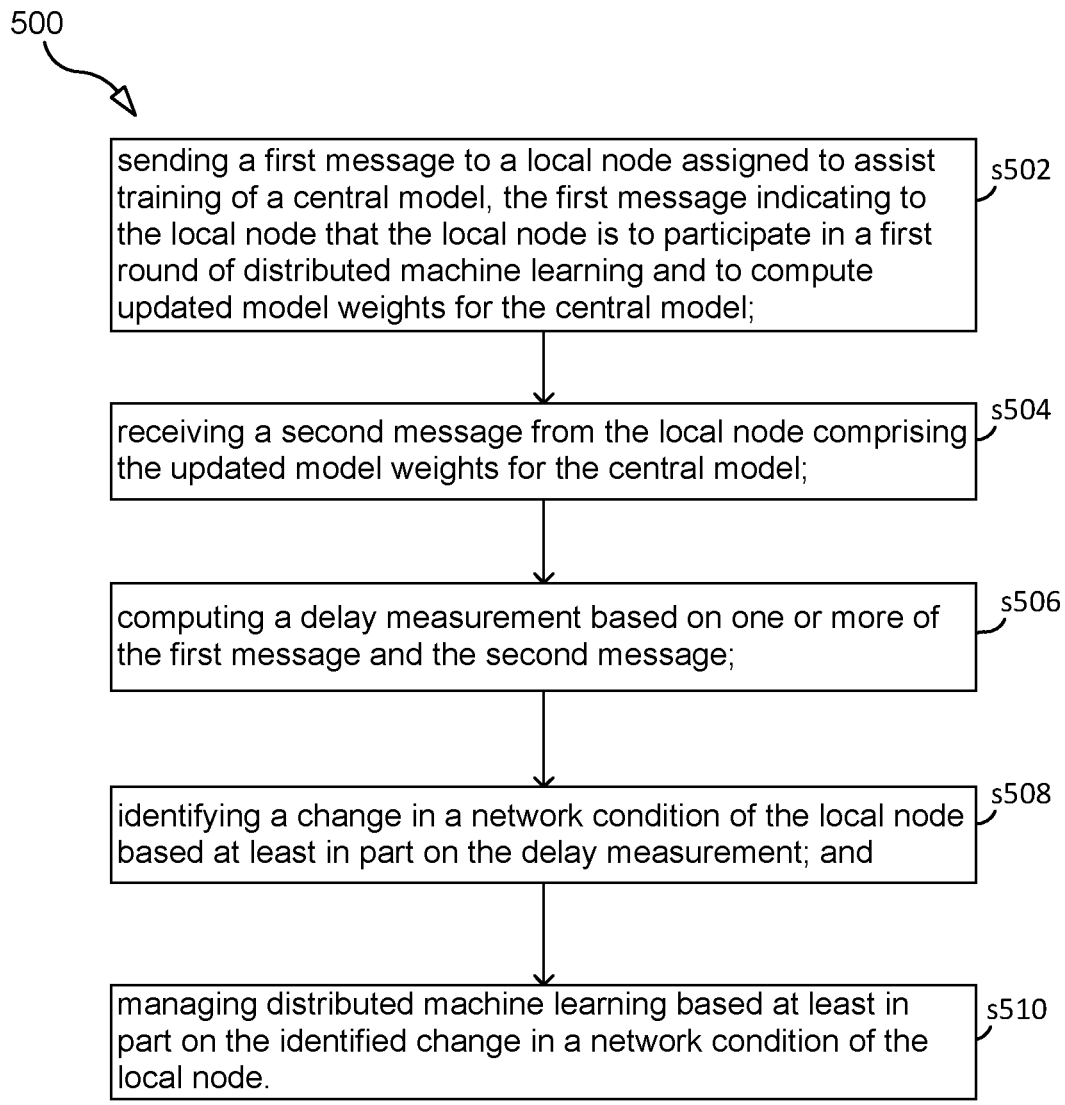
FIG. 5 is a flow chart according to an embodiment.

FIG. 5 illustrates a flow chart according to an embodiment. Process 500 is a method performed by a central server node 102 in a distributed machine learning environment (e.g., a federated learning environment). Process 500 may begin with step s502.

Step s502 comprises sending a first message to a local client node assigned to assist training of a central model, the first message indicating to the local client node that the local client node is to participate in a first round of distributed machine learning and to compute updated model weights for the central model.

Step s504 comprises receiving a second message from the local client node comprising the updated model weights for the central model.

Step s506 comprises computing a delay measurement based on one or more of the first message and the second message.

Step s508 comprises identifying a change in a network condition of the local client node based at least in part on the delay measurement.

Step s510 comprises managing distributed machine learning based at least in part on the identified change in a network condition of the local client node.

In some embodiments, the first message further includes initial model weights (e.g., the same initial model weights that the central server node 102 sends to each of the local client nodes 104 participating in the current (e.g., first) round of distributed machine learning). In some embodiments, managing distributed machine learning based at least in part on the identified change in a network condition of the local client node comprises: determining to include the local client node in a second round of distributed machine learning based at least in part on the identified change in a network condition of the local client node; and in response to the determining, sending a third message to the local client node, the third message indicating to the local client node that the local client node is to participate in the second round of distributed machine learning and to compute updated model weights for the central model. In some embodiments, managing distributed machine learning based at least in part on the identified change in a network condition of the local client node comprises determining not to include the local client node in a second round of distributed machine learning based at least in part on the identified change in a network condition of the local client node. In some embodiments, managing distributed machine learning based at least in part on the identified change in a network condition of the local client node comprises: in response to the identified change in a network condition of the local client node, clustering the local client node and one or more additional local client nodes based at least in part on the delay measurement; and determining, based at least in part on the clustering, to re-assign the local client node to another central model different from the central model.

In some embodiments, the third message further includes model weights (e.g., as aggregated from updated model weights from the local client nodes by the central server node, such as by averaging). In some embodiments, computing a delay measurement based on one or more of the first message and the second message comprises computing a round-trip delay based on both the first message and the second message. In some embodiments, computing a delay measurement based on one or more of the first message and the second message comprises computing a one-way delay based on the second message. In some embodiments, the method further includes sending additional messages to the local client node indicating to the local client node that the local client node is to participate in additional rounds of distributed machine learning and to compute updated model weights for the central model; receiving additional messages from the local client node comprising the updated model weights for the central model; computing, for each round of the additional rounds of distributed machine learning, a delay measurement based on the additional messages sent to and received from the local client node; and computing one or more of latency, throughput, and jitter based on the delay measurements, wherein identifying a change in a network condition of the local client node based at least in part on the delay measurement is further based at least in part on the one or more of latency, throughput, and jitter.

Figure 6:
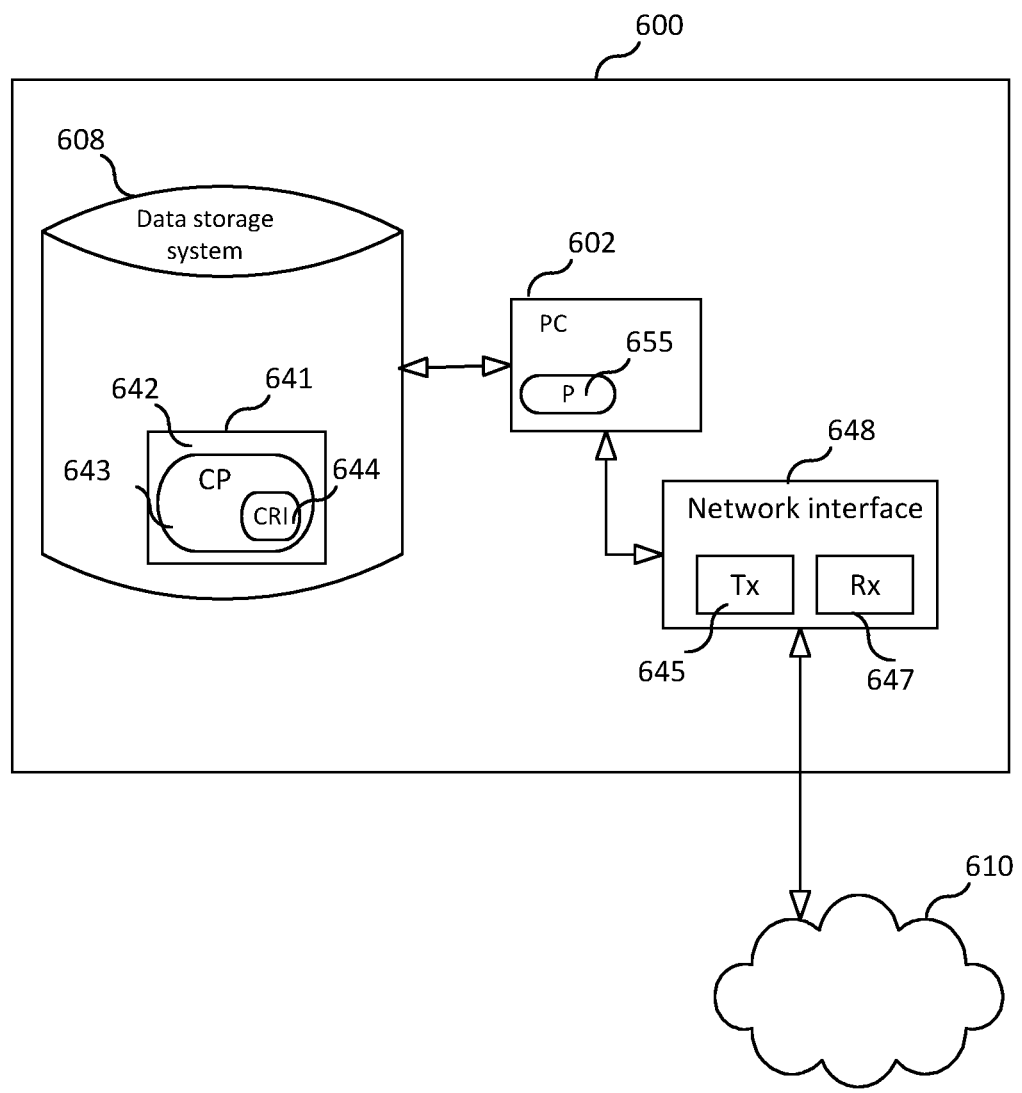
FIG. 6 is a block diagram of an apparatus according to an embodiment.

FIG. 6 is a block diagram of an apparatus 600 (e.g., a local client node 104 and/or central server node 102), according to some embodiments. As shown in FIG. 6, the apparatus may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like); a network interface 648 comprising a transmitter (Tx) 645 and a receiver (Rx) 647 for enabling the apparatus to transmit data to and receive data from other nodes connected to a network 610 (e.g., an Internet Protocol (IP) network) to which network interface 648 is connected; and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes the apparatus to perform steps described herein (e.g., steps described herein with reference to the flow charts). In other embodiments, the apparatus may be configured to perform steps described herein without the need for code. That is, for example, PC 602 may consist merely of one or more ASICs. Hence, the features of the embodiments described herein may be implemented in hardware and/or software.

Figure 7:
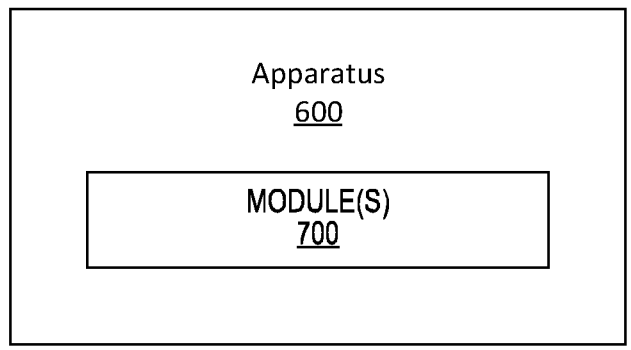
FIG. 7 is a block diagram of an apparatus according to an embodiment.

FIG. 7 is a schematic block diagram of the apparatus 600 according to some other embodiments. The apparatus 600 includes one or more modules 700, each of which is implemented in software. The module(s) 700 provide the functionality of apparatus 600 described herein (e.g., the steps herein, e.g., with respect to FIGS. 4-5).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a central server node in a distributed machine learning environment, the method comprising:
    obtaining first information regarding network conditions for a plurality of local client nodes, wherein the plurality of local client nodes includes a first client node and the first information comprises a first network performance indicator for the first client node;
    managing distributed machine learning for the plurality of local client nodes, wherein the managing comprises assigning a first set of the plurality of local client nodes to assist training of a first central model and assigning a second set of the plurality of local client nodes to assist training of a second central model;
    after assigning the first set to assist training the first central model and assigning the second set to assist training the second central model, obtaining second information regarding network conditions for the plurality of local client nodes, wherein the second information comprises a second network performance indicator for the first client node;
    based on the first and second network performance indicators, determining a change in network performance for the first network node;
    determining that the change in network performance for the first network node is greater than a threshold;
    as a result of determining that the change in network performance for the first network node is greater than the threshold, clustering the plurality of local client nodes into one or more clusters based at least in part on the second information regarding network conditions;
    re-assigning a local client node in the first set to the second set based on the clustering; and
    sending to the local client node a message including model weights for the second central model.

2. The method of claim 1, wherein obtaining the first information and/or the second information regarding network conditions for the plurality of local client nodes comprises performing passive monitoring of the network conditions.

3. The method of claim 2, wherein performing passive monitoring of the network conditions comprises computing one-way and/or round-trip delay times based on messaging between the central server node and the plurality of local client nodes relating to model weight computations.

4. The method of claim 3, further comprising estimating network conditions based on the obtained information regarding network conditions.

5. The method of claim 4, wherein estimating network conditions comprises estimating statistics for the network conditions over a time window, wherein the statistics include one or more of a mean, a median, a percentile, a standard deviation, a minimum, and a maximum, and wherein the network conditions include one or more of delay, delay jitter, and packet loss.

6. A method performed by a central server node in a distributed machine learning environment, the method comprising:
  sending a first message to a local client node assigned to assist training of a central model, the first message indicating to the local client node that the local client node is to participate in a first round of distributed machine learning and to compute updated model weights for the central model;
  receiving a second message from the local client node comprising the updated model weights for the central model;
  computing a delay measurement based on one or more of the first message and the second message;
  identifying a change in a network condition of the local client node based at least in part on the delay measurement; and
  managing distributed machine learning based at least in part on the identified change in a network condition of the local client node, wherein
  managing distributed machine learning comprises comparing the change in the network condition to a threshold and determining whether to include the local node in a second round of distributed machine learning based on the comparison.

7. The method of claim 6, wherein managing distributed machine learning based at least in part on the identified change in a network condition of the local client node comprises:
  determining to include the local client node in the second round of distributed machine learning; and
  in response to the determining, sending a third message to the local client node, the third message indicating to the local client node that the local client node is to participate in the second round of distributed machine learning and to compute updated model weights for the central model.

8. The method of claim 6, wherein managing distributed machine learning based at least in part on the identified change in a network condition of the local client node comprises determining not to include the local client node in the second round of distributed machine learning.

9. The method of claim 6, wherein managing distributed machine learning based at least in part on the identified change in a network condition of the local client node comprises:
  in response to the identified change in a network condition of the local client node, clustering the local client node and one or more additional local client nodes based at least in part on the delay measurement; and
  determining, based at least in part on the clustering, to re-assign the local client node to another central model different from the central model.

10. The method of claim 6, wherein computing a delay measurement based on one or more of the first message and the second message comprises computing a round-trip delay based on both the first message and the second message.

11. The method of claim 6, wherein computing a delay measurement based on one or more of the first message and the second message comprises computing a one-way delay based on the second message.

12. The method of claim 6, further comprising:
  sending additional messages to the local client node indicating to the local client node that the local client node is to participate in additional rounds of distributed machine learning and to compute updated model weights for the central model;
  receiving additional messages from the local client node comprising the updated model weights for the central model;
  computing, for each round of the additional rounds of distributed machine learning, a delay measurement based on the additional messages sent to and received from the local client node; and
  computing one or more of latency, throughput, and jitter based on the delay measurements,
  wherein identifying a change in a network condition of the local client node based at least in part on the delay measurement is further based at least in part on the one or more of latency, throughput, and jitter.

13. The method of claim 6, wherein the first message further comprises initial model weights, and wherein the initial model weights are the same initial model weights that the central server node sends to other local client nodes participating in the first round of distributed machine learning.

14. A central server node comprising:
  a memory; and
  a processor, wherein said processor is configured to:
  obtain first information regarding network conditions for a plurality of local client nodes, wherein the plurality of local client nodes includes a first client node and the first information comprises a first network performance indicator for the first client node;
  manage distributed machine learning for the plurality of local client nodes, wherein the managing comprises assigning a first set of the plurality of local client nodes to assist training of a first central model and assigning a second set of the plurality of local client nodes to assist training of a second central model;
  after assigning the first set to assist training the first central model and assigning the second set to assist training the second central model, obtain second information regarding network conditions for the plurality of local client nodes, wherein the second information comprises a second network performance indicator for the first client node;
  based on the first and second network performance indicators, determine a change in network performance for the first network node;
  determine that the change in network performance for the first network node is greater than a threshold;
  as a result of determining that the change in network performance for the first network node is greater than the threshold, cluster the plurality of local client nodes into one or more clusters based at least in part on the second information regarding network conditions;
  re-assign a local client node in the first set to the second set based on the clustering; and
  send to the local client node a message including model weights for the second central model.

15. A central server node comprising:
  a memory; and
  a processor, wherein said processor is configured to:

send a first message to a local client node assigned to assist training of a central model, the first message indicating to the local client node that the local client node is to participate in a first round of distributed machine learning and to compute updated model weights for the central model;

receive a second message from the local client node comprising the updated model weights for the central model;

compute a delay measurement based on one or more of the first message and the second message;

identify a change in a network condition of the local client node based at least in part on the delay measurement; and manage distributed machine learning based at least in part on the identified change in a network condition of the local client node, wherein managing distributed machine learning comprises comparing the change in the network condition to a threshold and to determine whether to include the local node in a second round of distributed machine learning based on the comparison.

16. The central server node of claim 15, wherein managing distributed machine learning based at least in part on the identified change in a network condition of the local client node comprises:

determining to include the local client node in the second round of distributed machine learning; and in response to the determining, sending a third message to the local client node, the third message indicating to the local client node that the local client node is to participate in the second round of distributed machine learning and to compute updated model weights for the central model.

17. The central server node of claim 15, wherein managing distributed machine learning based at least in part on the identified change in a network condition of the local client node comprises determining not to include the local client node in the second round of distributed machine learning.

18. The central server node of claim 15, wherein managing distributed machine learning based at least in part on the identified change in a network condition of the local client node comprises:

in response to the identified change in a network condition of the local client node, clustering the local client node and one or more additional local client nodes based at least in part on the delay measurement; and determining, based at least in part on the clustering, to re-assign the local client node to another central model different from the central model.

19. A non-transitory computer readable storage medium storing a computer program comprising instructions which when executed by processing circuitry causes the processing circuitry to perform the method of claim 1.

* * * * *